United States Patent [19]

Servent

[11] Patent Number: 4,704,095
[45] Date of Patent: Nov. 3, 1987

[54] RADIAL ACTION TORQUE LIMITER

[75] Inventor: Jean M. Servent, Paris, France

[73] Assignee: Societe ACC EL, Paris, France

[21] Appl. No.: 786,096

[22] Filed: Oct. 10, 1985

[51] Int. Cl.⁴ ............................................. F16D 7/06
[52] U.S. Cl. ................................... 464/37; 192/56 R
[58] Field of Search ................. 192/56 R; 464/30, 35, 464/36, 37, 38

[56] References Cited

U.S. PATENT DOCUMENTS

| | | | |
|---|---|---|---|
| 2,017,591 | 10/1935 | Dumm | 464/37 X |
| 2,429,091 | 10/1947 | Dodge et al. | 464/36 X |
| 2,758,457 | 8/1956 | Meyer et al. | 464/37 |
| 3,985,213 | 10/1976 | Braggins | 464/36 X |

FOREIGN PATENT DOCUMENTS 3315750 7/1984 Fed. Rep. of Germany ........ 464/35
2529280 12/1983 France .................................. 464/36

Primary Examiner—Daniel P. Stodola
Attorney, Agent, or Firm—Finnegan, Henderson, Farabow, Garrett & Dunner

[57] ABSTRACT

A torque limiter having a locking stud which radially slides in a drive part enters an associated slot in the inner periphery of a driven part coaxial with the drive part under the action of a radial-thrust blade spring. When an excessive torque is present between the drive and driven parts, the stud tends to leave its housing to disengage the drive and driven parts and thereby it laterally and outwardly clears intermediate rollers in order to decrease the distance between the spring and the stud and so that the force applied by the spring shall not increase during such unlocking.

Thus the unlocking is immediate and the oscillatory zone of the prior-art limiters is virtually eliminated.

15 Claims, 6 Drawing Figures

RADIAL ACTION TORQUE LIMITER

The present invention relates generally to torque limiters, and more particularly to a so-called radial action synchronous torque limiter for use especially with machine-tools and the like.

In the state of the art, torque limiters already are known which comprise a radially movable ball or roller in a drive part of the limiter which is pushed back by a spring means in a slot in the inside periphery of a coaxial driven part and surrounding the drive part (see for instance the French Pat. No. 2,483,026 and the U.S. Pat. No. 2,919,502). Under the influence of an angular overload applied to these torque limiters, the roller or the ball tends to leave its housing in order to decouple thereby the drive from the driven part.

However all the systems of the prior art incur a number of drawbacks. In the first place it is clear that the torque required to move the ball out of its housing progressively increases while the ball makes its exit due to the compression of the spring means increasing during that motion and accordingly an oscillatory zone is established for torque values between the torque at which the ball detaches from the bottom of its housing and the effective locking torque. This oscillatory zone is dangerously large and an obstacle to good accuracy of adjustment, and it makes it impossible to have effective protection against mechanical impacts corresponding to a time-limited overload.

Furthermore, once the ball or the roller has left its housing and rolls on the inner periphery of the driven part, the residual limiter torque may reach 30 to 40% of the set torque or limit torque. Accordingly automatic re-indexing of the drive and driven shafts—which is especially desirable in automated machining—is made impossible except by resorting to an auxiliary lashing system for the drive part in order to reestablish the locking by rotating said drive part. Such a solution is complex and costly.

Lastly none of the limiter systems of the prior art offers an automatic compensating feature relating to the plays from fabrication, whereby its accuracy is substantially degraded as regards re-transmitting the machine motions and re-indexing.

The objective of the present invention is to palliate these drawbacks and to provide a torque limiter with operational features especially adapted to high-precision machine tools of which the set torque or limit torque can be precisely determined, and where the decoupling of the drive part from the driven part can be implemented in very rapid and reliable manner.

To that end, the present invention relates to a torque limiter of the type including mutually coaxial driven and drive parts, at least one locking assembly which can be radially moved with respect to said drive part and arranged to be pushed back by a spring means into an associated groove in the inner periphery of the driven part, and characterized by comprising between said spring means and said assembly at least one intermediary member designed to make contact by means of at least one of a plurality of sharp edges provided on this member with an associated intermediate roller, where a mutual displacement between said intermediate member and said intermediate roller in a direction transverse to the radial displacement of said movable locking system is arranged in such a manner as to attenuate the force applied by said spring means on the movable locking system when tending to leave its groove due to an excessive torque between the drive and the driven parts.

The present invention shall be better understood by reading the detailed description provided in illustrative manner and in relation to the attached drawings.

Figure 1:
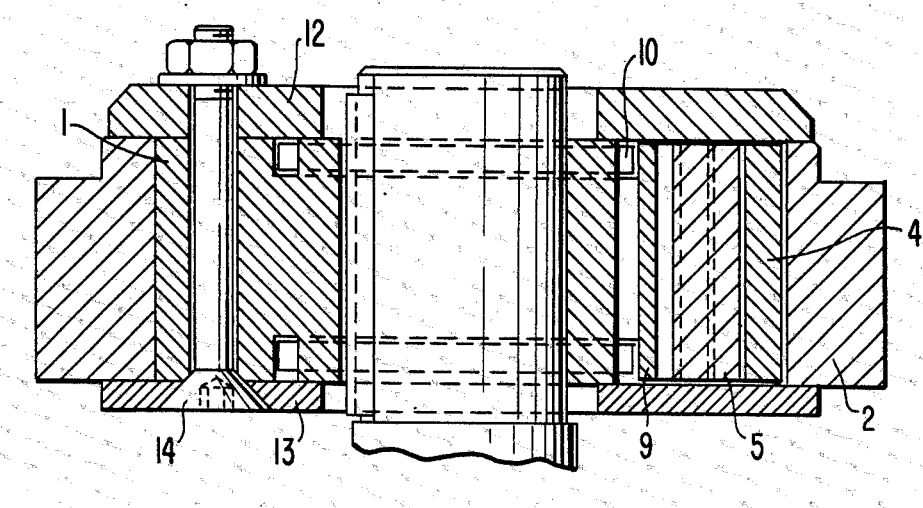
FIG. 1 is an elevation of a longitudinal section of a first preferred embodiment of a torque limiter of the present invention.
Figure 2:
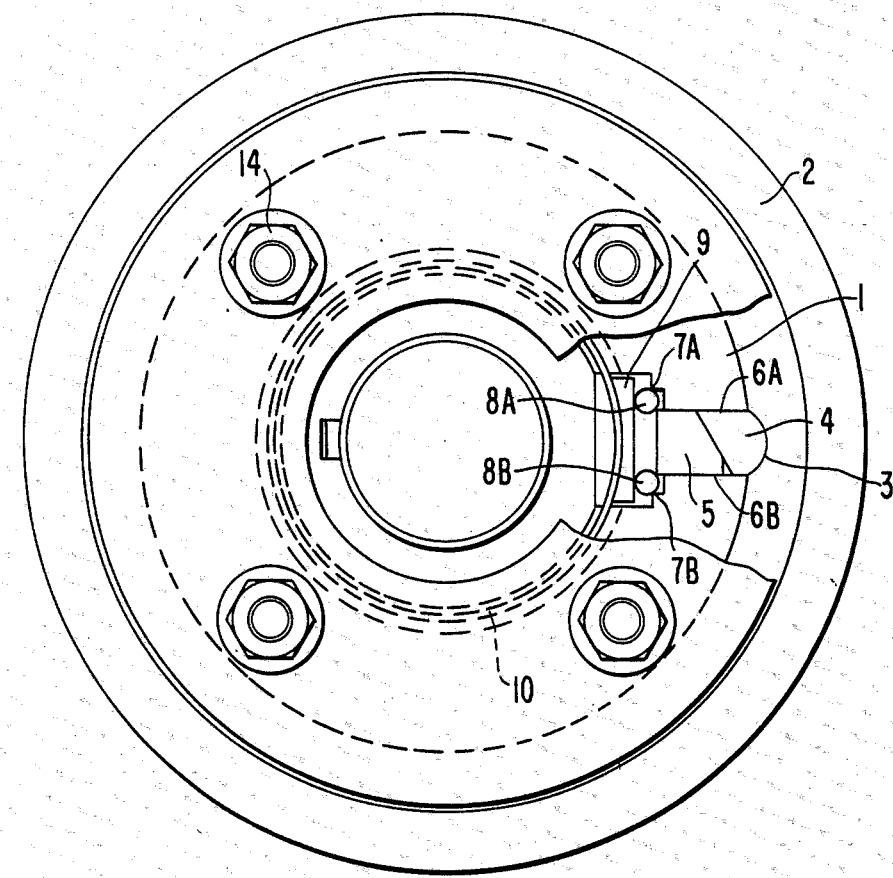
FIG. 2 is a topview with a partial cutaway of the limiter of FIG. 1.

As regards FIGS. 1 and 2, a torque limiter of a first embodiment of the invention includes a drive part 1 with an axial bore to receive a drive shaft (omitted) to which t can be solidly joined in rotation by any suitable means, and it further has an axial, double-shouldered T-slot defining two parallel radial slide faces 6A and 6B bounded inwardly by two axial edges 7A and 7B. The drive part 1 is mounted in rotating and coaxial manner in a driven part 2 in the shape of an annulus and to which a driven shaft (omitted) can be solidly joined in rotation. The inside of the driven part 2 has a groove 3 in the axial direction and of a substantially rounded form, which is arranged to receive the outer end of a locking stud 4 of corresponding shape. The member or stud 4 is mounted in sliding manner in said radial slot. Fastening bolts 14 are provided to rigidly join together the two plates 12,13 of the drive part 1, these plates being designed to keep the driven part 2 in place axially without clamping it.

The limiter locking assembly of this first embodiment mode includes a thrust stub 9 actuated by a circular blade spring 10 and designed to transmit the spring's externally directed radial thrust to a centering shoe 5 by means of two intermediary distribution rollers 8A, 8B. The rollers 8A, 8B are seated in lateral inside nollows of the T-shaped slot and cooperate on one hand with said intersections 7A and 7B of the drive part, and on the other hand with the inside edges of the centering shoe or intermediary member 5, as illustrated.

This arrangement determines a specific distribution of the force exerted by the spring 10 and transmitted by the stub 9 between a component applied to the shoe 5 and a component applied to the edges 7A and 7B. The shoe 5 transmits the thrust exerted on it to the locking stud 4 through two oblique and complementary surfaces of the shoe 5 and of the stud 4, and to keep the locking stud 4 inside its groove 3 of the driven part, it acts in such a manner that the drive and driven parts are rigidly joined in rotation so as to transmit a drive-means torque to a driven means.

Figure 3A:
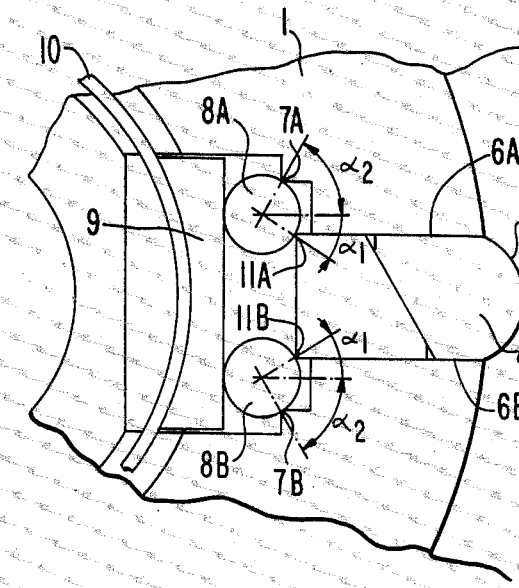
FIG. 3A and FIG. 3B are two partial cross-sections of the limiter of FIGS. 1 and 2 illustrating its operation.
Figure 3B:
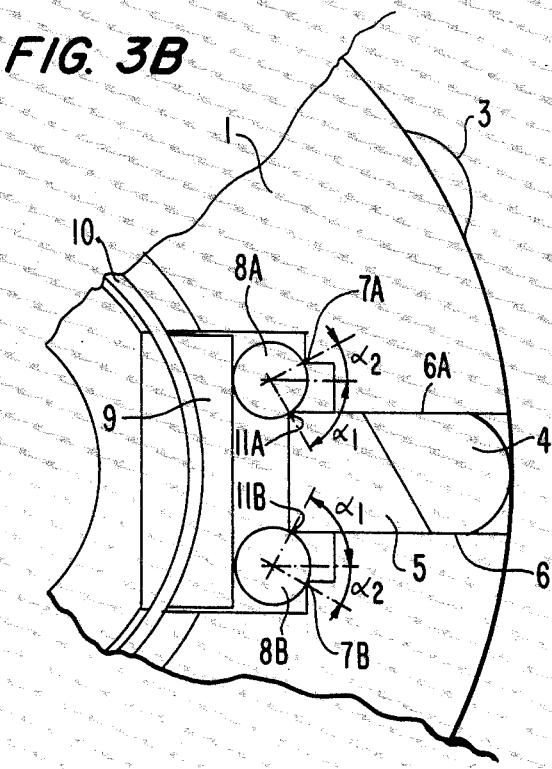

As regards the FIGS. 3A and 3B, the torque limiter described above operates as follows. When there is an excessive torque between the drive and driven parts, the corresponding transverse stress between the stud 4 and its groove 3 tends to make the former move out of the latter against the force of the spring 10. This inward radial motion is transmitted to the shoe 5 of which the inner edges 11A, 11B in contact with the intermediary rollers 8A, 8B can can spread out the latter into the recesses of the radial T-slot by a pivoting motion about the edges 7A, 7B of the drive part, whereby it basically follows (i) that the force distribution of the spring 10 is modified so that the component applied to the shoe 5 is progressively decreased as a function of the radial retraction of the stud 4, and (ii) the thrust stud 9 subjected to the action of the spring 10 is radially displaced but less than the actual displacement of the locking stud 4 and accordingly there is less of a compression of the spring 10 during unlocking (FIG. 3B).

According to the present invention therefore there is immediate unlocking when an excessive torque to be transmitted arises (for instance when a tool is jammed in the workpiece), and the machine on which the torque limiter is mounted and which most of the time is complex and costly therefore shall not be exposed to any danger of degradation from the prolongation of the excessive torque presence.

Obviously the dimensions of the various members of the locking assembly shall be computed in such a manner that the force exerted by the spring 10 can still be applied by means of the rollers 8A, 8B when the locking member is completely retracted whereby ultimately the assembly can be returned to its locked position.

Another feature of the present torque limiter is that in the unlocked position (FIG. 3B), the return force exerted by the spring 10 is considerably reduced, however without being zero, as stated, the friction torque in this position being advantageously low and automatic re-indexing after unlocking thus being very easily implemented.

Furthermore, as the above described operations are inverted in relocking, thereby the set torque or the limit torque are reset with high accuracy to their initial values.

Lastly, the structure of this torque limiter advantageously makes possible self-compensation of operational plays, highly accurate re-indexing being possible.

Figure 4:
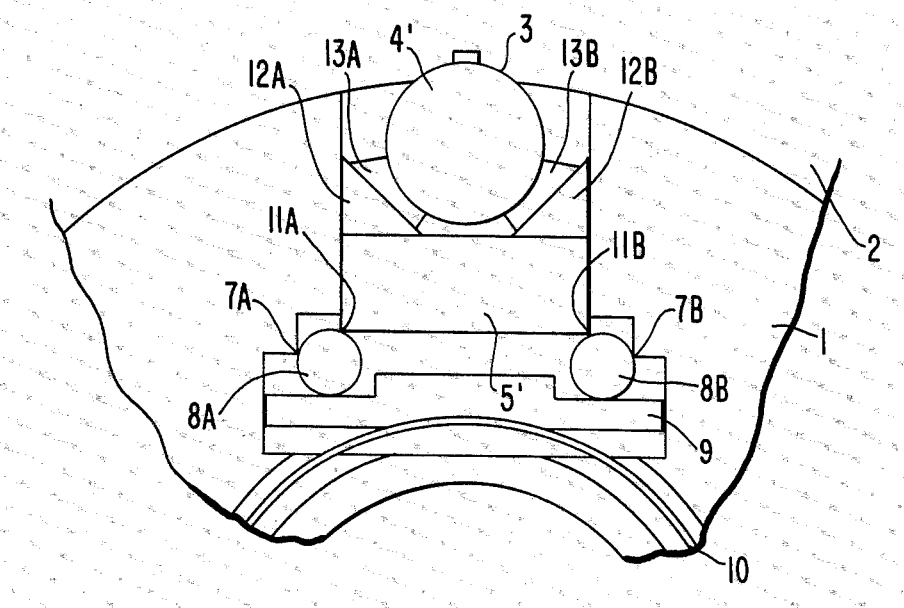
FIG. 4 is a partial cross-section of a second embodiment of the torque limiter of the present invention.
Figure 5:
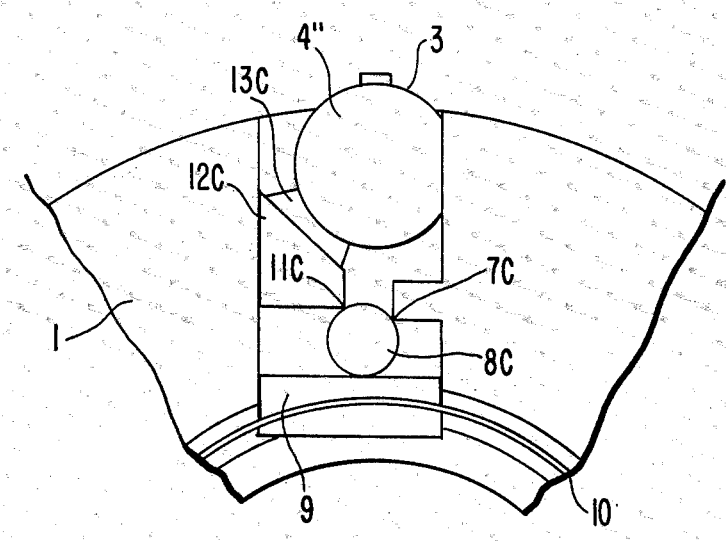
FIG. 5 is a partial cross-section of a third embodiment of the torque limiter of the present invention.

FIGS. 4 and 5 show two embodiment variations of the torque limiter of the present invention. Components identical with those shown in FIGS. 1,2, 3A and 3B are denoted herein by the same reference numerals.

As regards FIG. 4, the stud-shaped locking finger of FIGS. 1 and 2 is replaced here by a locking roller 4' centered by means of two auxiliary centering wedges 12A, 12B cooperating one one hand with the centering shoe 5' and on the other hand with the faces 6A and 6B of the slot of the drive part 1. Pads 13A, 13B are provided between the members 12A, 12B and the roller 4'. Obviously as concerns this embodiment, the groove 3 of the driven part has a curved shape fitted to that of said roller 4'. Also, this embodiment operates like that of the embodiment of FIGS. 1 and 2 as regards the respective behaviors of the rollers 8A, 8B and the various edges with which they cooperate to achieve the above-cited features.

As regards FIG. 5, the two rollers 8A, 8B of FIG. 4 are replaced by a single roller 8C directly acting on an intermediate centering member 12C cooperating in turn with a locking roller 4" provided with a flat surface in contact with the side of the slot. In case of unlocking, the lateral disengagement of the intermediary roller 8C is wholly similar to that of the rollers 8A, 8B of the previous embodiments, and the advantageous features are retained. (Obviously only two edges 7C, 11C cooperate with said intermediary roller).

Obviously too the present invention is not restricted to the described embodiments and includes any variation or modification within the knowledge of the expert. In particular the various subtended operational angles ($a_1$, $a_2$; FIGS. 3A and 3B) of the edges on the intermediate rollers can be determined in precise manner by appropriately sizing these members to obtain the desired transient features between the limit torque and the torque in the locked state. The selection of a desired limit torque or set torque furthermore can easily be implemented either by interchanging the spring 10 or by assembling intermediate rollers of a different diameter into the structure.

I claim:

1. A torque limiter, comprising a drive part and a driven part, one of said parts having an internal cylindrical peripheral surface and the other of said parts having an external cylindrical peripheral surface, said parts being coaxially disposed with said internal and external surfaces opposing one another concentrically, said internal surface having a groove therein, said external surface having a radial extending slot therein for registering with said groove and having a slot portion of a different width to form at least one fixed axially extending edge with a cavity laterally extending from said fixed edge;

a locking means movably disposed in said radial slot and having a surface configured to engage said groove for locking said drive and driven parts against relative rotation in the absence of torque above a preselected value;

an intermediate member slidably disposed in said slot and having an outer end adjacent said locking means and having an inner end with at least one axially extending edge spaced from said fixed edge;

rolling means disposed in said slot having a circumferential surface in physical engagement with both said spaced axially extending edges at times when said locking member is in said groove; and spring means engaging said rolling means to distribute a major force of the spring means to said edge of said intermediate member for urging said locking means radially in a first direction into said groove;

said rolling means being disposed to roll on said spaced edges at an angle to the axis of said edges away from the radial path of the edge of said intermediate member toward said cavity against the force of said spring means, in response to the radial displacement of said intermediate member in a direction opposite the first direction, for transferring the distributed force of the rolling means from said intermediate member directly to said one part upon displacement of said locking means from the groove.

2. A torque limiter according to claim 1 wherein said rolling means is comprised of at least one roller having an axis perpendicular to the direction of displacement of the intermediate member and parallel to the spaced edges.

3. A torque limiter according to claim 1 wherein the locking means has an oblique inner end surface and the adjacent end of the intermediate member has a complementary cooperating oblique contact surface in physical engagement with said inner end surface of said locking means.

4. A torque limiter according to claim 2 wherein the locking means has an oblique inner end surface and the adjacent end of the intermediate member has a complementary cooperating oblique contact surface in physical engagement with said inner end surface of said locking means.

5. A torque limiter according to claim 1 or 2 or 3 or 4 wherein the internal surface has an arcuate groove, and the outer end of the locking means has a complementary arcuate surface for engaging the groove.

6. A torque limiter according to claim 1 or 2 wherein the locking means includes a roller shaped portion with centering wedge means interposed between said roller shaped portion and the intermediate member.

7. A torque limiter according to claim 1 or 2 wherein the locking means includes a roller shaped portion with a pair of spaced centering wedge members interposed between said roller shaped portion and the intermediate member.

8. A torque limiter according to claim 1 or 2 wherein the locking means is comprised of a roller portion having a lateral flat surface in sliding engagement with a wall of said slot and includes a centering pad in engagement with the intermediate member and said roller portion.

9. A torque limiter according to claim 1 wherein the edge on the intermediate member defines the radial inner edge of said member.

10. A torque limiter according to claim 9 wherein the fixed edge bounds a lateral extension of the slot to form the cavity for receiving at least a portion of the rolling means upon the transfer of the distributed force of the spring means from said intermediate member to said one part.

11. A torque limiter according to claim 1 wherein the spring means is comprised of a circular blade spring coaxially mounted relative to the drive and driven parts.

12. A torque limiter according to claim 11 wherein the spring means further includes a thrust stub interposed between the blade spring and the rolling means for transmitting the force of the blade spring of the rolling means.

13. A torque limiter, comprising a drive part and a driven part, one of said parts having an internal cylindrical peripheral surface and the other of said parts having an external cylindrical peripheral surface, said parts being coaxially disposed with said internal and external surfaces opposing one another concentrically, said internal surface having a groove therein, said external surface having a radial extending slot therein for registering with said groove and having a slot portion of a greater width to form a pair of spaced fixed axially extending edges with a respective cavity laterally displaced from each said edge;

a locking member movably disposed in said radial slot and having a surface configured to engage said groove for locking said drive and driven parts against relative rotation in the absence of torque above a preselected value;

an intermediate member movably disposed in said slot and having an outer end adjacent said locking member and having an inner end with a pair of axially extending edges, each of said edges being spaced from and adjacent to a respective one of said fixed edges;

a pair of rollers, each having a circumferential surface in physical engagement with a respective pair of said adjacent inner end and fixed edges at times when said locking member is in said groove; and spring means urging said pair of rollers to distribute a major force of the spring means to said edges of said intermediate member for urging said locking member radially in a first direction into said groove;

each said rollers being disposed to roll on said respective pair of spaced edges at an angle to the axis of said edges out of the radial path of said intermediate member toward said cavity against the force of said spring means in response to the radial displacement of said intermediate member in a direction opposite the first direction, for transferring the distributed force of the pair of rollers from said intermediate member directly to said one part, upon the displacement of said locking member from said groove.

14. A torque limiter according to claim 13 wherein the locking member is in the form of a roller having an axis extending substantially parallel to the axis of said pair of spaced rollers.

15. A torque limiter according to claim 13 wherein the locking member is in the form of a polygon having an arcuate outer end for engaging the groove in the internal surface.

* * * * *